United States Patent

Furukawa et al.

[11] Patent Number: 5,110,888
[45] Date of Patent: May 5, 1992

[54] RESIN COMPOSITION

[75] Inventors: Hisao Furukawa; Yasushi Kato, both of Kobe; Jo Kawamura, Akashi, all of Japan

[73] Assignee: Kanegafuchi Kagaku Kogyo Kabushiki Kaisha, Osaka, Japan

[21] Appl. No.: 423,327

[22] Filed: Oct. 18, 1989

[30] Foreign Application Priority Data

Oct. 21, 1988 [JP] Japan .................. 63-266828

[51] Int. Cl.$^5$ .............................................. C08L 33/14
[52] U.S. Cl. ................... 526/312; 526/301; 526/279
[58] Field of Search ................ 526/301, 312, 279

[56] References Cited

U.S. PATENT DOCUMENTS 3,963,771  6/1976  Robson et al. .
4,785,064  11/1988  Hegel .................. 526/301

Primary Examiner—Paul R. Michl
Assistant Examiner—Thomas McDonald
Attorney, Agent, or Firm—Varndell Legal Group

[57] ABSTRACT

A resin composition comprising 5 to 100% by weight of a vinyl copolymer comprising 0.1 to 99% by weight of units having the formula (I):

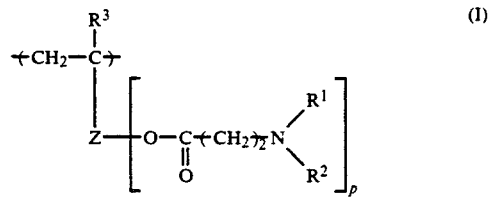

The composition of the invention is excellent in weatherability.

6 Claims, No Drawings

RESIN COMPOSITION

BACKGROUND OF THE INVENTION

The present invention relates to a resin composition, and more particularly to a resin composition containing a vinyl copolymer which has improved weatherability.

As a method for improving weatherability of resins, there are a method in which an age resister such as an ultraviolet absorber, an antioxidant or a light stabilizer is added to the resin, and a method in which the resin itself is improved.

Recently, the development of an age resister suitable for each resin has progressed as the degradation mechanism is made clear, and various age resisters have been employed in various fields. However, in a field such that resins are formed into relatively thin films, for instance, used as coatings, it is pointed out that the age resister bleeds from the film with the passage of time because of low molecular weight of the age resister, thus resulting in lowering the effect by the age resisters.

In order to solve the above disadvantage, there have been proposed, for instance, a method in which the ultraviolet absorber is converted into a high molecular weight compound or a method in which the ultraviolet absorber is grafted onto the resin. However, when converting the ultraviolet absorber into the high molecular weight compound, the compatibility of the ultraviolet absorber with the resin becomes poor. Also, when grafting the absorber on the resin, the mobility of the resin becomes poor, because segments capable of absorbing ultraviolet ray (UV) of the resin are solidified, (in other words, the UV absorption segments of the resin cannot be contributed to UV absorption), thus resulting in lowering the durability to UV of the resin.

An object of the present invention is to provide a resin composition having improved weatherability.

This and other objects of the present invention will become apparent from the description hereinafter.

SUMMARY OF THE INVENTION

It has now been found that when a side chain having a secondary or tertiary amino group is introduced into the main chain of the resin, the weatherability of the resin can be remarkably improved.

In accordance with the present invention, there is provided a resin composition comprising 5 to 100 % by weight of a vinyl copolymer comprising 0.1 to 99% by weight of units having the formula (I):

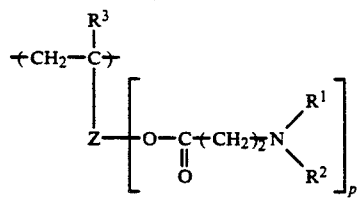

wherein $R^1$ is an alkyl, aryl or aralkyl group with 1 to 30 carbon atoms, R2 is a hydrogen atom or an alkyl, aryl or aralkyl group with 1 to 30 carbon atoms, $R^3$ is a hydrogen atom or a methyl group, Z is an organic group with a valence of 2 to 4, and p is an integer of 1 to 3.

DETAILED DESCRIPTION

In the composition of the present invention, the used copolymer is a vinyl copolymer (A) comprising 0.1 to 99 % by weight of the units having the formula (I):

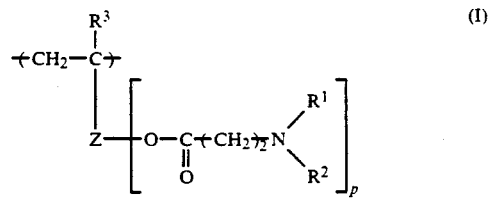

The group $R^1$ in the formula (I) is an alkyl, aryl or aralkyl group with 1 to 30, preferably from 1 to 20, carbon atoms, the group $R^2$ in the formula (I) is a hydrogen atom or an alkyl, aryl or aralkyl group with 1 to 30, preferably from 1 to 20, carbon atoms, and the group $R^3$ is a hydrogen atom or a methyl group.

Examples of the alkyl groups are, for instance, a cycloalkyl group such as cyclohexyl group as well as methyl group, butyl group, hexyl group, octyl group, 2-ethylhexyl group, dodecyl group, stearyl group, and the like. Examples of the aryl groups are, for instance, phenyl group, and the like. Examples of the aralkyl groups are, for instance, benzyl group, and the like.

The group Z in the formula (I) is an organic group with a valence of 2 to 4 and p is an integer of 1 to 3. A copolymer having units with the formula (I) wherein Z is a monovalent organic group (in other words, p is O) is not preferable, since such units have no site capable of bonding groups containing the secondary or tertiary amino group which can improve the weatherability.

Examples of the organic group Z are, for instance, an alkylene group, a polyetherurethane group, a polyesterurethane group, an organopolysiloxane group, and the like. Among the above-mentioned groups, the group containing polyether, polyester or organopolysiloxane, having the flexibility is preferable, and it is preferable that a number average molecular weight of Z is from 100 to 10,000. A copolymer having the units with the formula (I) wherein Z is a flexible organic group with a molecular weight of 100 to 10,000 can have more improved weatherability.

Further, as the group Z, there is preferable from the viewpoint of weatherability the polyesterurethane group, which is, for instance, a group removed a group: $-OCOCH=CH_2$ and a group: $-OCOC(CH_3)=CH_2$ from a compound prepared by reacting an isocyanate compound, which is obtained by reacting a polyfunctional isocyanate compound as mentioned below with a hydroxyl group-containing (meth)acrylate so as to leave excess isocyanate groups in the obtained compound, with a hydroxyl group-containing polyester (meth)acrylate.

The term "(meth)acrylate" used in the instant specification means acrylate and methacrylate.

The content of the units having the formula (I) in the copolymer (A) is from 0.1 to 99% by weight, preferably from 2 to 80% by weight, more preferably from 5 to 50% by weight. When the content of the units (I) in the copolymer (A) is less than 0.1% by weight, the weatherability can be little improved. On the other hand, when the content is more than 99% by weight, the yellowing caused by amino group becomes problematic.

In the invention, other units than the units (I) to be contained in the copolymer (A) are not particularly limited. Examples of the other units are, for instance, an unsaturated carboxylic ester such as methyl acrylate, methyl methacrylate, ethyl acrylate, ethyl methacrylate, butyl acrylate, butyl methacrylate, 2-ethylhexyl acrylate, 2-ethylhexyl methacrylate, stearyl acrylate, stearyl methacrylate, benzyl acrylate, benzyl methacrylate, cyclohexyl acrylate, cyclohexyl methacrylate, trifluoroethyl acrylate, trifluoroethyl methacrylate, pentafluoropropyl acrylate, pentafluoropropyl methacrylate, a diester or half ester of an unsaturated polycarboxylic acid (for instance, maleic acid, fumaric acid, itaconic acid, and the like) with a linear or branched alcohol having 1 to 20 carbon atoms; an aromatic hydrocarbon vinyl compound such as styrene, α-methylstyrene, chlorostyrene, styrenesulfonic acid, 4-hydroxystyrene or vinyl toluene; a vinyl ester such as vinyl acetate or vinyl propionate; an allyl compound such as diallyl phthalate; a nitrile group-containing vinyl compound such as acrylonitrile or methacrylonitrile; an epoxy group-containing vinyl compound such as glycidyl acrylate or glycidyl methacrylate; an amino group-containing vinyl compound such as dimethylaminoethyl acrylate, dimethylaminoethyl methacrylate, diethylaminoethyl acrylate, diethylaminoethyl methacrylate, vinylpyridine, aminoethyl vinyl ether; an amide group-containing vinyl compound such as acrylamide, methacrylamide, itaconic diamide, α-ethylacrylamide, α-ethylmethacrylamide, crotone amide, malediamide, fumardiamide, N-vinyl pyrrolidone, N-butoxymethyl acrylamide, N-butoxymethyl methacrylamide, N,N-dimethylacrylamide, N-methylacrylamide or acryloyl morpholine; a hydroxyl group-containing vinyl compound such as 2-hydroxyethyl acrylate, 2-hydroxyethyl methacrylate, 2-hydroxypropyl acrylate, 2-hydroxypropyl methacrylate, 2-hydroxyethyl vinyl ether, N-methylolacrylamide, N-methylolmethacrylamide, or "Aronix 5700" (commercially available from Toagosei Chemical Industry Co., Ltd.), "Placcel FA-1" (commercially available from Daicel Chemical Industries, Ltd.), "Placcel FA-4", "Placcel FM-1", "Praccel FM-4"; an unsaturated carboxylic acid such as acrylic acid, methacrylic acid, maleic acid, fumaric acid or itaconic acid or a salt (for instance, alkali metal salt, ammonium salt, amine salt, and the like) thereof; an unsaturated carboxylic anhydride such as maleic anhydride or a salt thereof; an other vinyl compound such as vinyl methyl ether, vinyl chloride, vinylidene chloride, chloroprene, propylene, butadiene, isoprene, maleimide, N-vinylimidazole or vinylsulfonic acid; units derived from a vinyl monomer such as a hydrolyzable silyl group-containing vinyl compound having the formula (II):

$$(R^5)-\underset{\underset{X_n}{|}}{\overset{\overset{(R^4)_{3-n}}{|}}{Si}} \quad (II)$$

wherein $R^4$ is an alkyl, aryl or aralkyl group having 1 to 10 carbon atoms, $R^5$ is an organic residue having a polymerizable double bond, X is a hydrolyzable group such as a hydrogen atom, a halogen atom, an alkoxyl group, an acyloxy group, a ketoxymate group, an amino group, an amide group, an aminoxy group, a mercapto group or an alkenyloxy group, and n is an integer of 1 to 3; units derived from monomers or prepolymers used upon preparing resins suitable for use of coatings; and the like. Examples of the hydrolyzable silyl group-containing vinyl compounds (II) are, for instance,

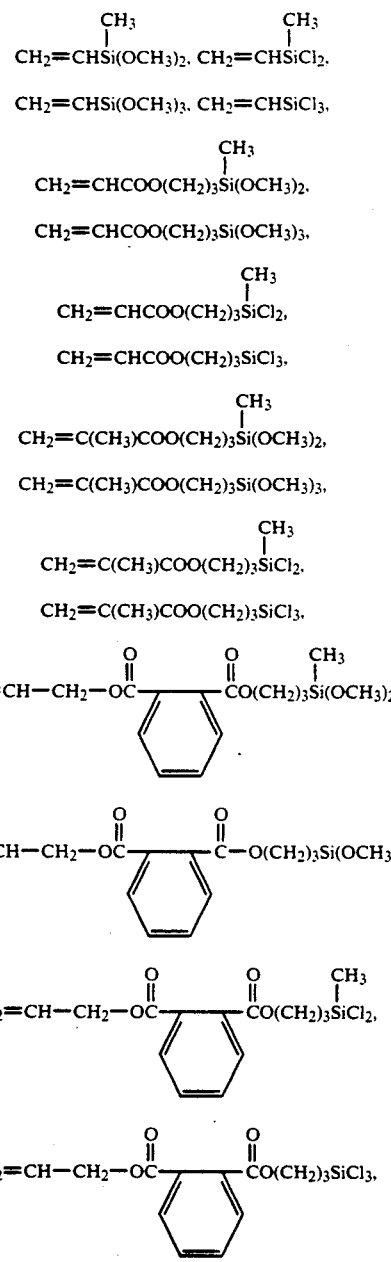

and the like.

The above-mentioned copolymer (A) can be prepared in any manner without particular limitation. For instance, the copolymer (A) can be prepared as follows:

(1) An oligomer (a) having an acryloyl group and a group $CH_2=C(R^3)$—wherein $R^3$ is as defined above in the molecule and having the formula (III):

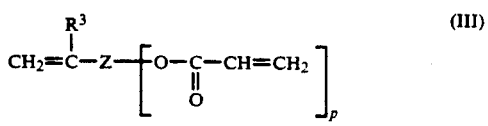

wherein $R^3$, Z and p are as defined above is prepared by reacting an isocyanate compound, which is obtained by reacting a polyfunctional isocyanate compound with a hydroxyl group-containing (meth)acrylate so as to leave excess isocyanate group in the obtained compound (the obtained isocyanate compound having one or more isocyanate groups), with a hydroxyl group-containing polyester (meth)acrylate. It is preferable that in case of using the hydroxyl group-containing acrylate in preparation of the isocyanate compound, the hydroxyl group-containing polyester methacrylate is reacted with the isocyanate compound. Also, it is preferable that in case of using the hydroxyl group-containing methacrylate in the isocyanate compound preparation, the hydroxyl group-containing polyester acrylate is reacted with the isocyanate compound.

(2) A prepolymer (b) having the formula (V):

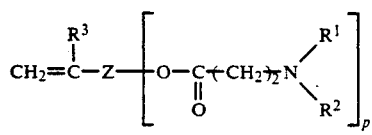

wherein $R^1$, $R^2$, $R^3$ and p are as defined above is prepared by subjecting the acryloyl group of the oligomer (a) to Michael's addition reaction of an amine compound having the formula (IV):

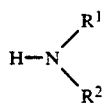

wherein $R^1$ and $R^2$ are as defined above.

(3) The copolymer (A) is prepared by copolymerizing the prepolymer (b) with the polymerizable compound therewith as mentioned above.

Examples of the polyfunctional isocyanate compounds are, for instance, isophorone diisocyanate, 2,4-toluylenediisocyanate, hexamethylene diisocyanate, diphenylmethane-4,4'-diisocyanate, xylylene diisocyanate and lysine methyl ester diisocyanate,

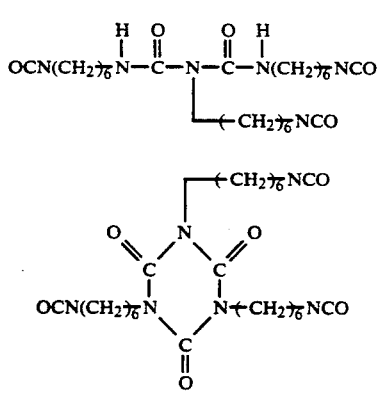

and the like. Also, there can be used a compound having both the group $CH_2=C(R^3)-$ and isocyanate group in the molecule such as β-isocyanate ethyl (meth)acrylate, (meth)acryloyl isocyanate or benzene-1-(1-isocyanate-1-methyl ethyl)-4-(1-methyl ethenyl)

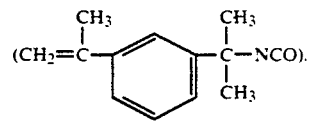

Example of the hydroxyl group-containing (meth)acrylate are, for instance, hydroxyethyl (meth)acrylate, hydroxypropyl (meth)acrylate, hydroxybutyl (meth)acrylate,

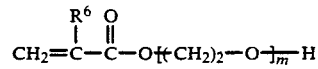

in which $R^6$ is a hydrogen atom or methyl group and m is an integer of 1 to 100,

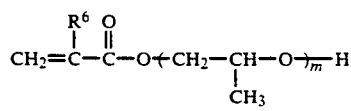

in which $R^6$ and m are as defined above,

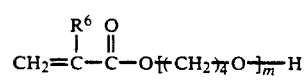

in which $R^6$ and m are as defined above,

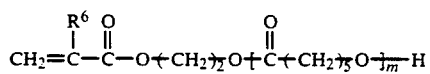

in which $R^6$ and m are as defined above,

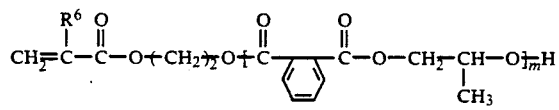

in which $R^6$ and m are as defined above, or

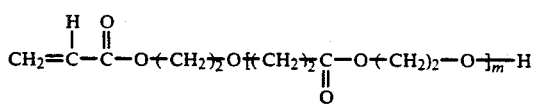

in which m is and as defined above, poly(meth)acrylate prepared using as occasion demands an organic diol or triol as a chain elongating agent, and the like.

The hydroxyl group-containing polyester (meth)acrylate can be obtained by condensation polymerization of (meth)acrylic acid with a polyfunctional alcohol such as ethylene glycol, propylene glycol, glycerol or trimethylolpropane and a polyfunctional carboxylic acid such as phthalic acid, adipic acid or trimellitic acid (1,2,4-benzenetricarboxylic acid).

The oligomer (a) obtained in the step (1) is not particularly limited so long as the oligomer (a) has one or more acryloyl group and one group $CH_2=C(R^3)-$ wherein $R^3$ is as defined above.

As to the reaction of the polyfunctional isocyanate with the hydroxyl group-containing (meth)acrylate in the step (1), it is preferable that a polyfunctional isocyanate such that the reactivity of the one isocyanate group is different from the reactivity of the other isocyanate group, e.g. isophorone diisocyanate or lysine methyl ester diisocyanate, is reacted with the hydroxyl group-containing (meth)acrylate at a temperature of 20° to 150° C. in a molar ratio of isocyanate group : hydroxyl group of (not less than 2) : 1.

As to the reaction of the obtained isocyanate compound with the hydroxyl group-containing polyester (meth)acrylate, it is preferable that the obtained isocyanate compound is reacted with the hydroxyl group-containing polyester (meth)acrylate at a temperature of 20° to 150° C. in a molar ratio of remaining isocyanate group : hydroxyl group of 1 : (1.0 to 1.3).

When using the compound having both the group $CH_2=C(R^3)-$ and isocyanate group as mentioned above, the oligomer (a) can be prepared by reacting the above compound with the hydroxyl group-containing acrylate in a molar ratio of isocyanate group : hydroxyl group of 1 : (1.0 to 1.3).

Examples of the amine compounds to be reacted with the oligomer (a) are, for instance, a primary amine such as butyl amine, hexyl amine, octyl amine, 2-ethylhexyl amine, dodecyl amine, stearyl amine, cyclohexyl amine or benzyl amine; a secondary amine such as diethyl amine, dibutyl amine, di-2-ethylhexyl amine or methyl cyclohexyl amine, and the like.

In order to inhibit the radical polymerization due to (meth)acryloyl groups in the oligomer (a) during the step (2), it is preferable to add a polymerization inhibitor such as hydroquinone, benzoquinone, phenothiazine, hydrozuinone monomethyl ether (MEHQ) or 2,6-di-t-butyl-4-methylphenol (BHT) to the reaction system prior to the reaction. MEHQ or BHT is preferable as the polymerization inhibitor from the viewpoint of prevention of colorlation. The addition reaction of the oligomer (a) with the amine compound (IV) can proceed in the absence of a catalyst. There may be used a catalyst capable of promoting addition reaction, e.g., a tertialy amine such as dimethylbenzylamine or 2,4,6-tris(dimethylaminoethyl) phenol; a quaternary ammonium salt such as benzyltrimethylammonium hydroxide or benzyltrimethylammonium chloride; an alkali such as sodium methoxide; and the like.

When Michael's addition reaction of the oligomer (a) with the amine compound (IV) is carried out, the oligomer (a) and the amine compound (IV) are mixed in a molar ratio of acryloyl group in the oligomer (a) : amine compound (IV) of 1 : (0.9 to 1.2) and the mixture is reacted at ordinary temperature to 200° C. in the substantial absence of water. In the reaction, it is preferable to add the oligomer (a) to the amine compound (IV) from the viewpoint of prevention of side reactions. Because the reactivity of amino group to acryloyl group is higher than the reactivity of amino group to methacryloyl group, though the oligomer (a) has both acryloyl group and methacryloyl group, the amine compound is selectively introduced into the acryloyl group.

Then, in the step (3), the desired copolymer (A) can be obtained by copolymerizing the prepolymer (b) with the other copolymerizable monomer as mentioned above.

The copolymer (A) has a number average molecular weight of, generally about 1,000 to 100,000, preferably 1,000 to 50,000.

The resin composition of the invention has 5 to 100% by weight, preferably from 10 to 100% by weight, of the copolymer (A). When the content of the copolymer (A) is less than 5% by weight, the effect for improving the weatherability is little.

Other components to be added to the copolymer (A) in the composition of the invention are not limited. Examples of the other components are, for instance, lacquers and modified acrylic lacquers, CAB acrylic lacquers, two-composition acrylic urethane resins, melamine alkyd resin, acrylic melamine resins, alkyd resins, acrylic silicon resins, and the like. Further, solvents, pigments, extender pigments, fillers, curing agents, curing catalysts, levelling agents, antisagging agents, lustering agents and antioxidants can be added.

As mentioned above, the composition of the present invention is excellent in weatherability and is suitable for use of coatings, sealing agents, potting agents, films, and other molding materials.

The copolymer (A) having the secondary or tertiary amino groups on its side clains which is contained in the composition of the invention has the effect for remarkably improving the weatherability, and the cause for the above effect can be considered, though it is not made clear, as something of a light stabilizing effect. Also, it can be excepted that the light stabilizing effect is more exhibited, since the side chain of the copolymer (A) is flexible and has a measure of the chain length, so, the amino group, which is an active site capable of exhibiting the light stabilizing effect, can be mobile, even if the film is cured. Further, it can be considered that the effect for improving the weatherability is not lowered due to bleed of the age register added, differing from the conventional method wherein the age register is added, because the component improving the weatherability in the copolymer (A) is bonded to the vinyl main chain of the copolymer (A) through flexible side chains.

Known ultraviolet absorbers such as Tinuvine 328 and Tinuvine P or known antioxidants such as Irganox 1010 may be added to the composition of the invention, and it is possible to synergistically improve the weatherability of the composition by combination with the known age resister.

The present invention is more specifically described and explained by means of the following Examples in which all % and parts are by weight unless otherwise noted. It is to be understood that the present invention is not limited to the Examples, and various changes and modifications may be made in the invention without departing from the spirit and scope thereof.

REFERENCE EXAMPLE 1

Preparation of a prepolymer (b)

A reactor equipped with a stirrer, a thermometer, a tube for introducing nitrogen, a dropping funnel and a condenser was charged with 93.2 g of isophorone diisocyanate (IPDI) and 0.1 g of dibutyltin dilaurate (DTL), to which 46.0 g of 2-hydroxyethyl methacrylate and 0.2 g of 2,6-di-t-butyl-4-methylphenol (BHT) was added dropwise over 1 hour with stirring at 30° C. under nitrogen gas. Then, 300 g of toluene and 340.2 g of Placcel FA-4, $CH_2=CH-COO+CH_2\rightarrow_2O+CO(CH_2)_5O+_4H$ (Mn: 573) were added thereto, and the reaction was carried out at 95° C. for 3 hours.

According to an infrared absorption spectrum of the obtained product, it was confirmed that the absorption based on NCO (2270 cm$^{-1}$) disappeared and the absorption based on methacryloyl group (1630 cm$^{-1}$) and the absorption based on acryloyl group (980 cm$^{-1}$) were seen.

Then, a mixture of 115.6 g of n-dodecyl amine and 99.7 g of toluene was added thereto dropwise at 30° C. over 1 hour and further the reaction was continued at 60° C. for 1 hour to give a copolymer (b) with a solid content of 60%.

In the infrared absorption spectrum of the obtained prepolymer (b), the absorption based on acryloyl group (980 cm$^{-1}$) disappeared. The obtained copolymer (b) had a number average molecular weight, measured according to gel permeation chromatography (GPC), of 1,300.

EXAMPLE 1

A reactor equipped with a stirrer, a thermometer, a tube for introducing nitrogen, a dropping funnel and a condenser was charged with 160 g of butyl acetate and the temperature was elevated to 110° C. To the reactor was added dropwise over 5 hours with stirring (bubbling with nitrogen) a mixture of 100 g of styrene, 195 g of methyl methacrylate, 100 g of butyl acrylate, 100 g of 2-hydroxyethyl methacrylate, 5.0 g of acrylic acid, 83.3 g of the obtained prepolymer (b) in Reference Example 1, 23.8 g of azobisisobutyronitrile and 47.5 g of butyl acetate.

Then, a mixture of 1.25 g of azobisisobutyronitrile and 50 g of butyl acetate was added thereto over 1 hour at 110° C., and the post-polymerization was conducted for 2 hours. To the polymerization mixture was added butyl acetate to give a butyl acetate solution of an acrylic polyol (1) having a non-volatile matter content of 60%.

The obtained acrylic polyol (1) had a number average molecular weight of about 6,000.

The obtained butyl acetate solution of polyol (1) and titanium oxide (commercially available under the trade mark "CR-90" from Ishihara Sangyo Kabushiki Kaisha) to give a white enamel with a PWC(pigment weight content) 40%.

To the obtained white enamel was added (commercially available under the trade mark "Super Beckermine J-820" from DAINIPPON INK AND CHEMICALS, INC., with a non-volatile matter content of 60%) in an amount of 50 parts based on 100 parts of the resin solid matter of the acrylic polyol (1) and was diluted with butyl acetate to give a coating composition having a viscosity of 30 cps.

As to the obtained coating composition, the weatherability was measured as follows:

An urethane primer surfacer was coated on a surface of a polished mild steel plate (70 mm×150 mm) and cured, and then was polished in a usual manner. Then, the obtained coating composition as above was coated on the film of the surfacer and was baked at 150° C. for 30 minutes to give a film with a thickness of 50 μm.

The film was subjected to weathering test, using an accelerated weathering tester (commercially available under the trade mark "UVCON" from Atlas Electric Devices Co. in one cycle of an UV cycle of 70° C. and 8 hours and a condensing cycle of 50° C., 98% RH and 4 hours. The 60°- specular gloss of the film was measured according to JIS K 5400. The results are shown in Table 1.

COMPARATIVE EXAMPLE 1

The procedure of Example 1 was repeated except that the prepolymer (b) was not used to give an acrylic polyol (2) having a non-volatile matter content of 60%.

The weatherability of the polyol (2) was measured in the same manner as in Example 1. The results are shown in Table 1.

EXAMPLE 2

A reactor equipped with a stirrer, a thermometer, a tube for introducing nitrogen, a dropping funnel and a condenser was charged with 160 g of xylene and the temperature was elevated to 110° C. To the reactor was added dropwise over 5 hours with stirring (bubbling with nitrogen) a mixture of 100 g of styrene, 195 g of methyl methacrylate, 100 g of butyl acrylate, 100 g of γ-methacryloyloxypropyltrimethoxysilane, 5.0 g prepolymer (b) in Reference Example 1, 23.8 g of azobisisobutyronitrile, 5 g of methanol and 47.5 g of toluene.

Then, a mixture of 1.25 g of azobisisobutyronitrile and 50 g of xylene was added dropwise thereto over 1 hour at 110° C., and the post-polymerization was conducted for 2 hours. To the polymerization mixture was added xylene to give a xylene solution of a hydrolyzable silyl group-containing acrylic polymer (3) having a non-volatile matter content of 60%.

The obtained silyl group-containing acrylic polymer (3) had a number average molecular weight of about 5,500.

The obtained acrylic polymer (3) and CR-90 were admixed to give a white enamel having a PWC of 40%.

To the obtained white enamel was added dibutyl tin dilaurate in an amount of 1 part based on 100 parts of the resin solid matter of the xylene solution of the acrylic polymer (3) and was diluted with xylene to give a coating composition having a viscosity of 30 cps.

As to the obtained coating composition, the weatherability was measured as follows:

The obtained composition was spray-coated on the surface of the polished mild steel plate coated with the primer surfacer, cured and polished which was obtained in the same manner as in Example 1, and the coated film was dried at 60° C. for 30 minutes and further dried at room temperature for one week to cure the film. The cured film had a thickness of 50 μm. Then, the procedure of Example 1 was repeated to measure the 60°- specular gloss of the cured film. The results are shown in Table 1.

COMPARATIVE EXAMPLE 2

The procedure of Example 2 was repeated except that the prepolymer (b) was not used to give a hydrolyzable silyl group-containing acrylic polymer (4) having a non-volatile matter content of 60%.

The weatherability was measured in the same manner as in Example 2.

The results are shown in Table 1.

TABLE 1

| Ex. No. | 60° - Specular gloss | | |
|---|---|---|---|
| | Initial | After 1,000 hours | After 2,000 hours |
| Ex. 1 | 90 | 91 | 85 |
| Ex. 2 | 89 | 90 | 89 |
| Com. Ex. 1 | 90 | 86 | 40 (chalking) |
| Com. Ex. 2 | 89 | 89 | 75 |

As apparent from the results shown in Table 1, it would be understood that the gloss of the film prepared from the composition of the invention is lowered little, in other words, the weatherability of the composition of the invention is excellent.

The composition of the invention is suitable for uses requiring the weatherability, for instance, exterior coatings, sealing agents, potting agents, molding materials and films, and the like.

In addition to the ingredients used in the Examples, other ingredients can be used in the Examples as set forth in the specification to obtain substantially the same results.

What we claim is:

1. A resin composition comprising 5 to 100% by weight of a vinyl copolymer comprising 0.1 to 99% by weight of units having the formula (I):

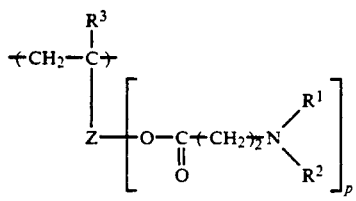

wherein $R^1$ is an alkyl, aryl or aralkyl group with 1 to 30 carbon atoms, $R^2$ is a hydrogen atom or an alkyl, aryl or aralkyl group with 1 to 30 carbon atoms, $R^3$ is a hydrogen atom or a methyl group, Z is an organic group with a valence of 2 to 4, and p is an integer of 1 to 3.

2. The composition of claim 1, wherein Z is a polyesterurethane.

3. The composition of claim 1, wherein said group $R^3$ is a methyl group.

4. A resin composition comprising 5 to 100% by weight of a vinyl copolymer including a sufficient amount within the range of 0.1 to 99% by weight of units having the formula (I) for improving weatherability of said resin composition:

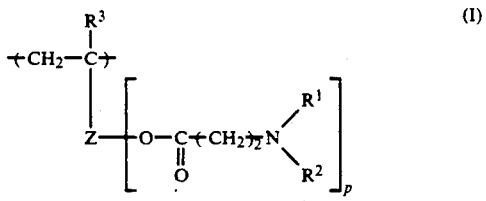

wherein $R^1$ is an alkyl, aryl or aralkyl group with 1 to 30 carbon atoms, $R^2$ is a hydrogen atom or an alkyl, aryl or aralkyl group with 1 to 30 carbon atoms, $R^3$ is a hydrogen atom or a methyl group, Z is an organic group with a valence of 2 to 4, and p is an integer of 1 to 3.

5. The composition of claim 4, wherein Z is a polyesterurethane.

6. The composition of claim 4, wherein said group $R^3$ is a methyl group.

* * * * *